Figure 1:
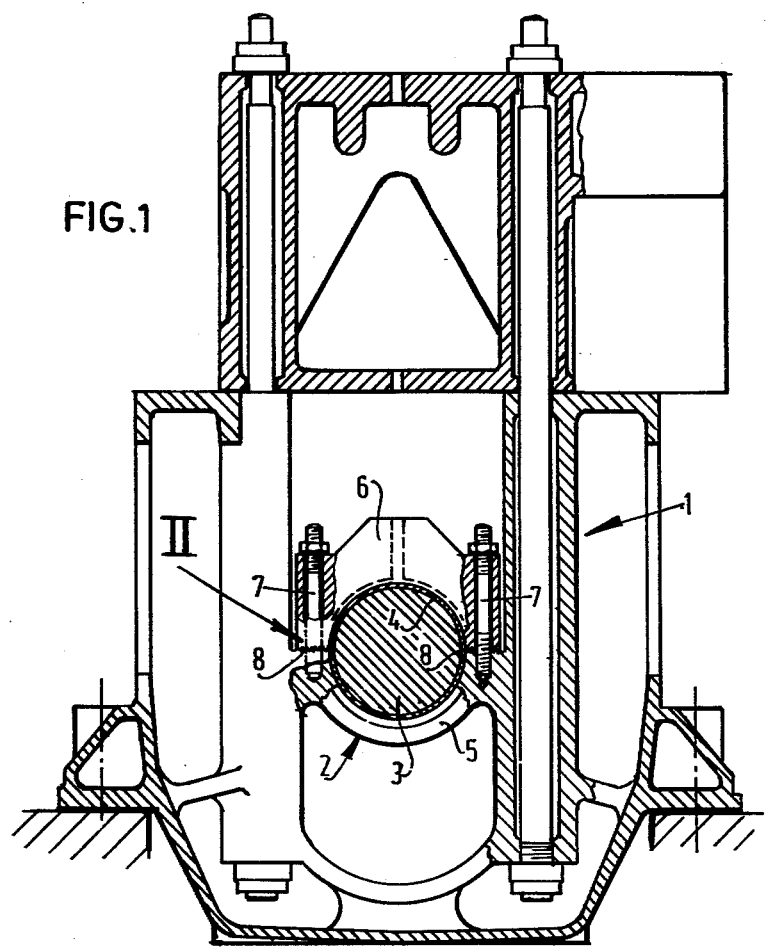

United States Patent [19]

Koskuba

[11] 4,093,322
[45] June 6, 1978

[54] SLIDE BEARING FOR USE IN A COMBUSTION ENGINE AND ENGINE EQUIPPED WITH SUCH A BEARING

[75] Inventor: Karel Koskuba, Duivendrecht, Netherlands

[73] Assignee: Stork-Werkspoor Diesel B.V., Amsterdam, Netherlands

[21] Appl. No.: 731,448

[22] Filed: Oct. 12, 1976

[30] Foreign Application Priority Data

Oct. 10, 1975 Netherlands ............... 7511971

[51] Int. Cl.² ............................................. F16C 25/02
[52] U.S. Cl. ............................. 308/23; 10/1 R; 123/195 H; 308/15; 308/74; 403/344
[58] Field of Search ............. 308/23, 167, 179, 179 S, 308/15, 22, 74, 237 R, 238, 245; 123/195 H; 74/579 E; 403/344; 10/1 R; 29/463

[56] References Cited

U.S. PATENT DOCUMENTS

| 2,287,735 | 6/1942 | Halford | 74/579 E |
| 2,553,935 | 5/1951 | Parks | 308/23 |

Primary Examiner—Trygve M. Blix
Assistant Examiner—Reinhard J. Eisenzopf
Attorney, Agent, or Firm—Snyder, Brown & Ramik

[57] ABSTRACT

A slide bearing for a shaft absorbing a radial load on the shaft varying in direction, said bearing comprising two or more bearing bushings held in place by means of two bearing caps provided at their boundary surfaces with meshing teeth securing them against relative displacements wherein the bottom of the valley between each pair of adjacent teeth of at least one bearing cap has a groove.

12 Claims, 2 Drawing Figures

SLIDE BEARING FOR USE IN A COMBUSTION ENGINE AND ENGINE EQUIPPED WITH SUCH A BEARING

The invention relates to a slide bearing for a shaft absorbing a radial load varying in direction, said bearing comprising two or more bearing bushings held in place by means of two bearing caps provided at their boundary surfaces with meshing teeth for securing them against mutual displacement. Such bearings may be employed as main bearings and connecting rod bearings in combustion engines. The interengaging teeth of the boundary surfaces of the bearing caps ensure an accurate positioning of the two halves of the bearing bore. This construction has, however, the disadvantage that in the bottom of the valley between adjacent teeth high tensile stresses are produced by the contact pressure, under the influence of which pressure the angles between the adjacent teeth are likely to increase. These stresses may even considerably increase locally due to small differences in the pitch of the toothing. With a view thereto the manufacturing accuracy of the bearing caps has to meet severe requirements in order to avoid cracks starting from the heavily loaded bottom of the toothing valleys.

The invention has for its object to provide a construction not involving problems due to the occurrence of high tensile stresses.

According to the invention the bottom of the cavity between each pair of adjacent teeth of at least one bearing cap has a groove. Owing to this groove zones of pressure stress are generated at the side of the groove. Thus the deformation of the teeth and the adaptation to small deviations from the desired dimensions are in the first place compensated for by a variation of the pressure stress in said zones. The effects of the deformation of the teeth and said adaptation become manifest only to a minor extent in the zone below the groove where tensile stress is prevailing.

In a particularly effective embodiment of the bearing in accordance with the invention the groove has a depth of 0.2 to 2-times the height of a tooth, a width of 0.1 to 0.4-times the pitch of the toothing and a radius of curvature at most equal to half the width of the groove.

The invention furthermore relates to a combustion engine comprising slide bearings constructed in the manner described above.

The invention relates, moreover, to bearing caps for a slide bearing of the described construction.

The invention will be described more fully hereinafter with reference to one embodiment shown in the drawing. In the drawing, FIG. 1 is a sectional view of part of a combustion engine comprising a main bearing in accordance with the invention and FIG. 2 is an enlarged view of a detail of FIG. 1.

In the frame 1 of a combustion engine the bearing 2 for the crank shaft 3 is formed by bearing bushings 4 enclosed by means of bearing caps 5 and 6. The bearing cap 6 is fixed to the bearing cap 5 with the aid of bolts 7. The boundary surfaces of the bearing caps 5 and 6 are provided with toothings 8 engaging one another. In this way a very accurate localisation of the caps 5 and 6 relative to one another is obtained so that the bore accommodating the bearing bushings 4 will very accurately occupy the desired position.

Figure 2:
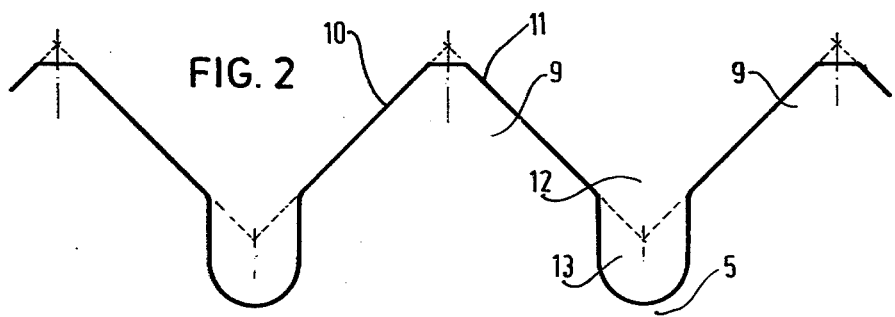

FIG. 2 shows on an enlarged scale part of the toothing of the cap 5. The toothing is formed by teeth 9 having slanting faces 10 and 11. Between two adjacent teeth 9 the bottom 12 of the valley has a groove 13. Owing to this groove 13 the material near the root of the teeth 9 is loaded in a considerably more favourable manner. In the absence of such a groove very high tensile stresses are produced near the bottom of the valley so that cracks are very likely to occur. Owing to the groove pressure stress is produced in operation in the zones on either side of the groove 13. In the event of inaccuracy of dimensions and of deformation of the teeth due to the contact pressure on the faces 10 or 11 the deformations are in the first place compensated for by a variation of the pressure stress in the zones on either side of the groove 13.

What we claim:

1. A slide bearing for a shaft absorbing a radial load on the shaft varying in direction, said bearing comprising two or more bearing bushings held in place by means of two bearing caps provided at their boundary surfaces with meshing teeth securing them against relative displacements, each tooth having slanting opposite side faces such that adjacent faces of adjacent teeth of each bearing cap extend convergently downwardly to define a valley, the bottom of the valley between each pair of adjacent teeth of at least one bearing cap having a groove extending below said bottom of the valley.

2. A slide bearing as claimed in claim 1 characterised in that the groove has a depth of 0.2 to 2-times the height of a tooth, a width of 0.1 to 0.4-times the pitch of the toothing and a radius of curvature at most equal to half the width of the groove.

3. A combustion engine comprising slide bearings constructed as defined in claim 2.

4. A bearing cap for use in a slide bearing as claimed in claim 2.

5. A combustion engine comprising slide bearings constructed as defined in claim 1.

6. A bearing cap for use in a slide bearing as claimed in claim 1.

7. A slide bearing assembly for a shaft, said assembly comprising in combination:

a pair of bearing support members each having a semicircular saddle and a parting face on either side of said saddle, the parting faces of one member being disposed in face-to-face contact with the parting faces of the other member, and screw thread means joining said members and maintaining said face-to-face contact;

interfitting means on said contact faces for establishing and maintaining exact registration between said members whereby said saddles are accurately registered to define a circular bearing seat; and a bearing insert received in each of said saddles;

said interfitting means comprising a set of teeth on each of said contact faces, each set of teeth comprising a plurality of essentially uniformly spaced teeth each extending generally parallel to the axis of said circular bearing seat and each having slanting opposite side faces whereby adjacent sides of adjacent teeth of a set define a V-shaped valley, the sets of teeth on the parting faces of one member being oriented with respect to the sets of teeth on the parting faces of the other member such that the sets of teeth of said one member are received in the valleys between the teeth of the sets of the other member and vice versa whereby to establish and maintain said registration, and the valleys between at least one set of teeth of each pair of sets which are interengaged being provided with U-shaped grooves of widths and depths sufficient to allow deformations of the teeth of said one set and thereby accommodate for slight irregularities in said essentially uniform spacing between the teeth of each set.

8. A slide bearing assembly as defined in claim 7 wherein each U-shaped groove is of a depth of 0.2 to 2 times the height of a tooth and of a width which is 0.1 to 0.4 times the spacing between teeth.

9. The slide bearing assembly as defined in claim 8 wherein one of said members is a connecting rod cap.

10. The slide bearing assembly as defined in claim 8 wherein one of said members is formed in the block of an internal combustion engine and the other member is a main bearing cap.

11. The slide bearing assembly as defined in claim 7 wherein one of said members is a connecting rod cap.

12. The slide bearing assembly as defined in claim 7 wherein one of said members is formed in the block of an internal combustion engine and the other member is a main bearing cap.

* * * * *